United States Patent
Rand et al.

(10) Patent No.: US 6,234,425 B1
(45) Date of Patent: May 22, 2001

(54) RELEASE FITTING FOR BALLOONS

(75) Inventors: James Leland Rand; Debora Ann Grant, both of San Antonio, TX (US)

(73) Assignee: Winzen Engineering Incorporated, San Antonio, TX (US)

(*) Notice: Subject to any disclaimer, the term of this patent is extended or adjusted under 35 U.S.C. 154(b) by 0 days.

(21) Appl. No.: 09/309,901

(22) Filed: May 11, 1999

(51) Int. Cl.$^7$ .............. B64D 17/00; B64D 1/12; B64D 1/04
(52) U.S. Cl. .............. 244/147; 244/137.4; 89/1.57
(58) Field of Search .............. 244/137.4, 147; 89/1.14, 1.57; 102/347, 411, 415; 403/2, 87, 110

(56) References Cited

U.S. PATENT DOCUMENTS

| | | |
|---|---|---|
| 723,292 | 3/1903 | Metzger . |
| 988,597 | 4/1911 | Schutte . |
| 1,144,578 | 6/1915 | Andersson . |
| 1,376,121 | 4/1921 | Smyth . |
| 2,612,328 | 9/1952 | Huch ..................... 244/31 |
| 2,650,127 * | 8/1953 | Carlson .................. 294/83 |
| 2,656,293 | 10/1953 | Huch ..................... 154/85 |
| 2,767,941 | 10/1956 | Gegner et al. ........... 244/31 |
| 2,886,263 | 5/1959 | Ferguson ................ 244/31 |
| 2,960,298 | 11/1960 | Jones .................... 244/153 |
| 3,151,825 | 10/1964 | Kindling ................ 244/31 |
| 3,391,883 | 7/1968 | Curtis ................... 244/31 |
| 3,754,496 * | 8/1973 | Noel ..................... 89/1 B |
| 4,032,086 | 6/1977 | Cooke ................... 244/30 |
| 4,102,519 | 7/1978 | Crosby, Jr. ............. 244/125 |
| 4,125,233 | 11/1978 | Winker et al. .......... 244/33 |
| 4,387,868 | 6/1983 | Regipa .................. 244/31 |
| 4,394,998 | 7/1983 | Taillet et al. ........... 244/31 |
| 4,434,958 | 3/1984 | Rougeron et al. ....... 244/126 |
| 4,775,564 | 10/1988 | Shriver et al. .......... 428/35 |
| 4,877,205 | 10/1989 | Rand ..................... 244/31 |
| 5,040,748 * | 8/1991 | Torre et al. ............. 244/158 R |
| 5,104,059 | 4/1992 | Rand et al. ............. 244/31 |
| 5,612,124 | 3/1997 | Krummhever et al. ... 442/181 |
| 5,612,126 | 3/1997 | Cross et al. ............ 442/227 |
| 5,612,129 | 3/1997 | Karhuketo et al. ...... 428/323 |
| 5,614,303 | 3/1997 | Baigas, Jr. .............. 442/247 |
| 5,614,305 | 3/1997 | Paine et al. ............. 428/301.1 |
| 5,614,307 | 3/1997 | Andersen et al. ........ 428/294.7 |

OTHER PUBLICATIONS

Countdown Gegins For Earth–Orbiting Balloons, Popular Mechanics, May 1997. p. 19.
Solutions, Winzen Engineering, 1998.
Balloon Assisted Launch To Orbit An Historical Prospective, Rand, Jul. 1997.

* cited by examiner

Primary Examiner—Charles T. Jordan
Assistant Examiner—Christian M. Best
(74) Attorney, Agent, or Firm—Guy McClung

(57) ABSTRACT

A release fitting for releasably holding at least one line to at least one item, the release fitting having a first body part, a second body part, and a third body part, the first and second body parts pivotably secured to the third body part, a bolt with a first bolt portion connected to a first portion of the first body part and a second bolt portion connected to a first portion of the second body part, at least one pin suitable for attaching thereto the at least one line, the first body part having a recess for releasably receiving an end of the pin, the bolt initially holding apart the first portion of the first body part and the first portion of the second body part to thereby maintain a second pin end in the recess, the third body part connected to the at least one item, bolt cutter apparatus for selectively cutting the bolt to release the at least one line from the pin.

3 Claims, 6 Drawing Sheets

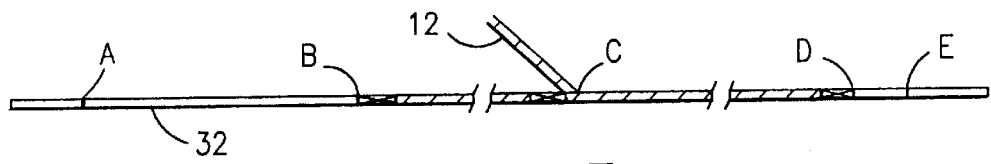
FIG. 5
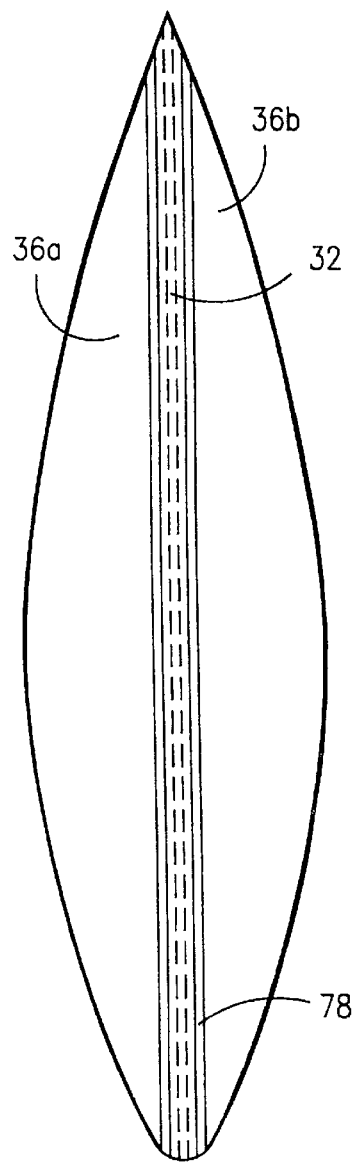
FIG. 6A
FIG. 6B
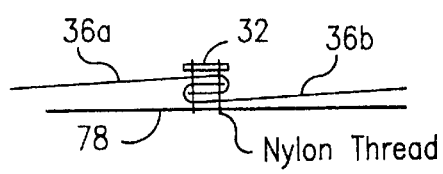
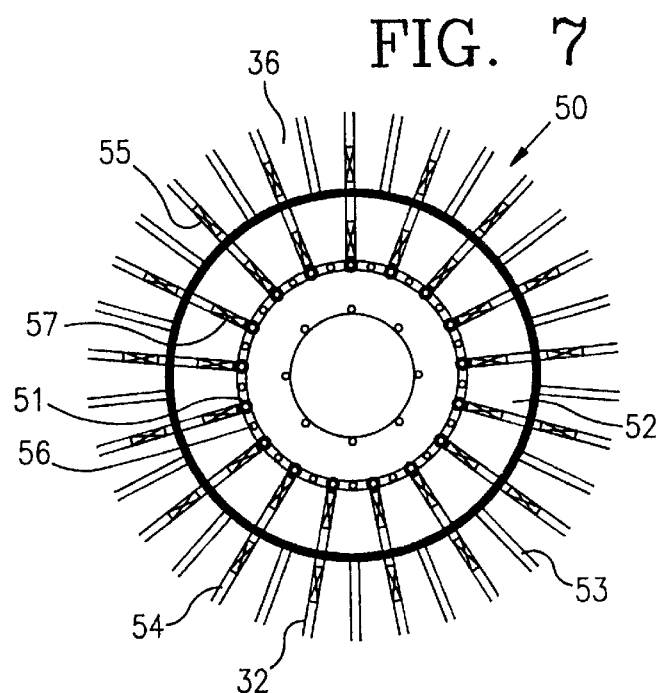
FIG. 7
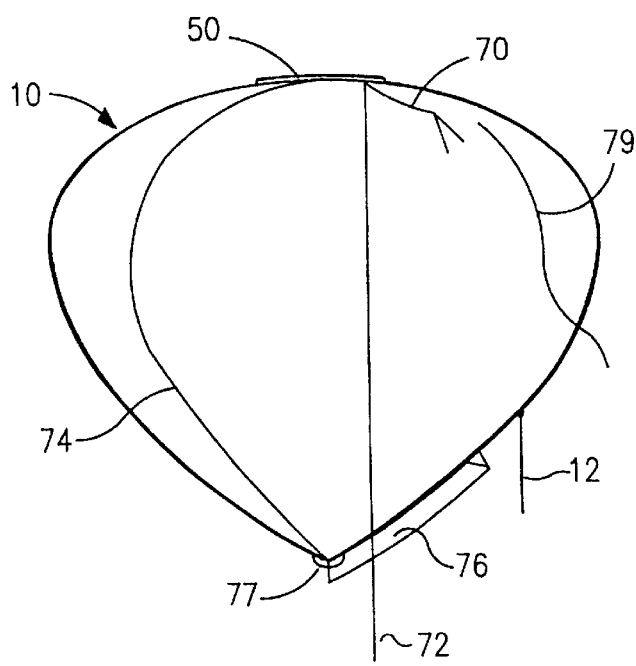
FIG. 8

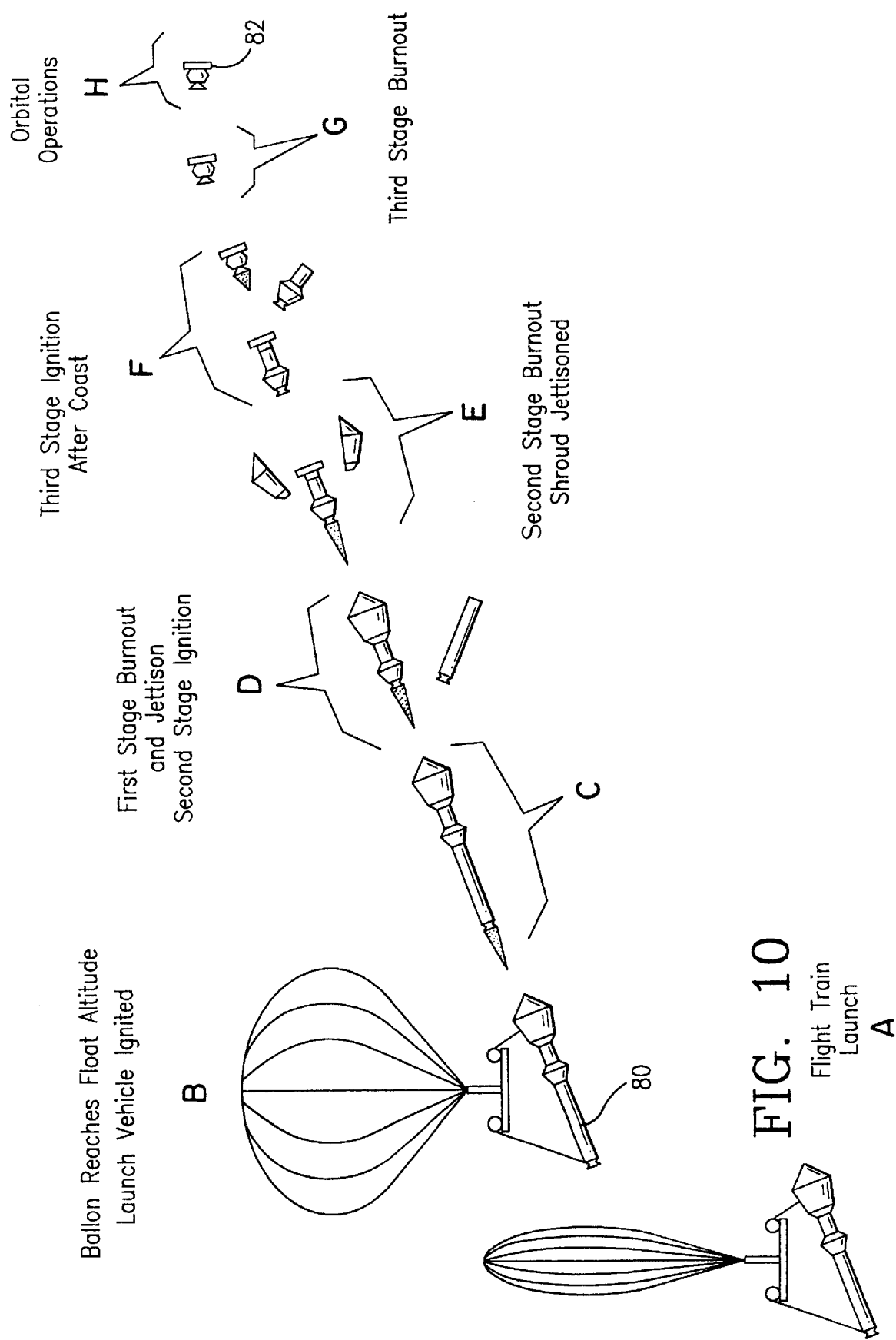

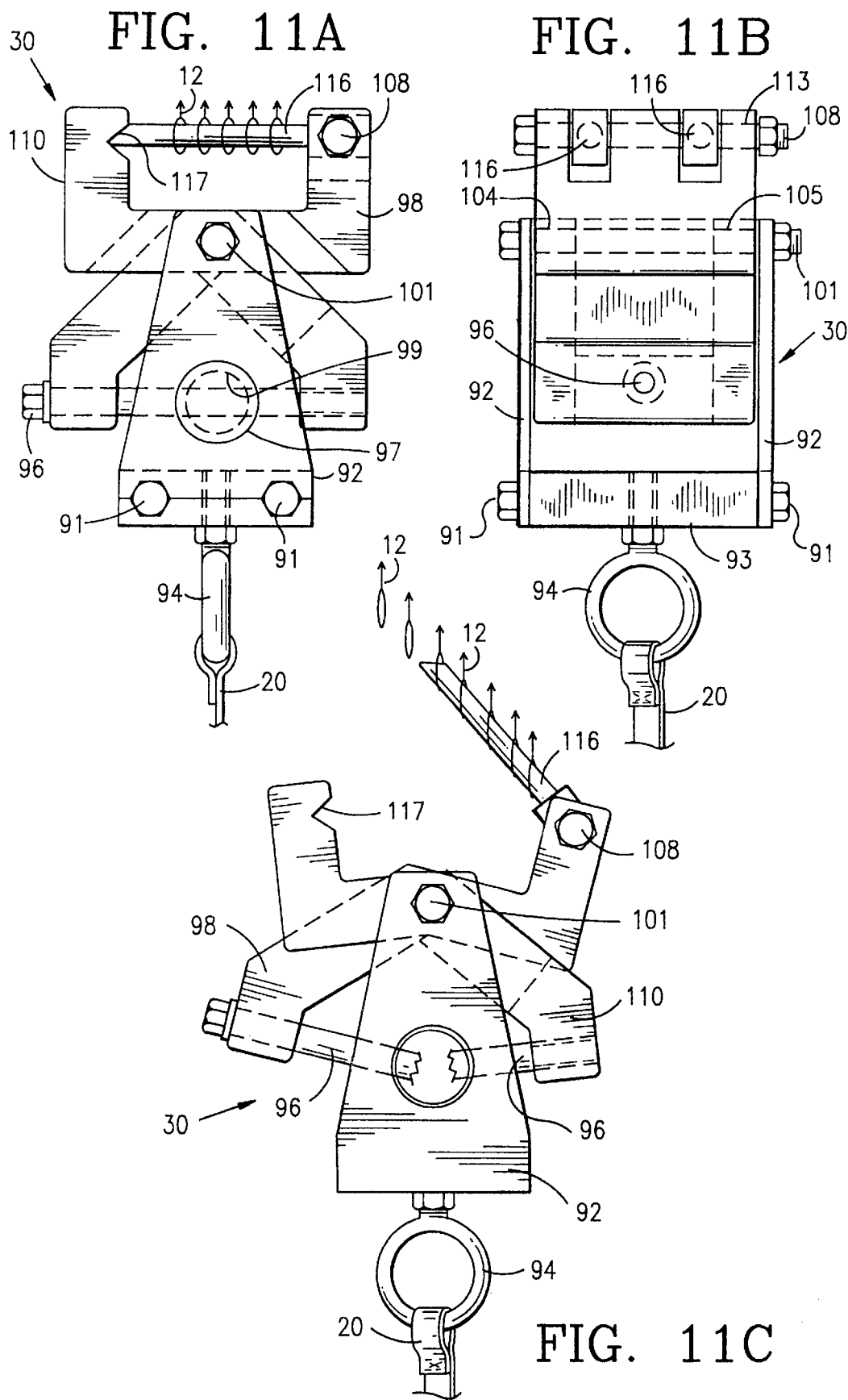

RELEASE FITTING FOR BALLOONS

GOVERNMENT RIGHTS

This invention was made with Government support under Contract No. F 29601-96-C-0036 awarded by the U.S. Air Force. The Government has certain rights in the invention.

BACKGROUND OF THE INVENTION

1. Field of the Invention

This invention is related to: balloons; methods of making balloons; methods of launching balloons; and methods of launching other items from balloons. In one particular aspect, this invention is related to the assisted launch of a satellite into earth orbit by a rocket carried to a launch height by a balloon.

2. Description of Related Art

The prior art discloses a variety of balloons and static heavy lift launch techniques using balloons. Stratospheric ballooning and launch techniques have developed over the years primarily to support scientific experiments for a variety of purposes, e.g. but not limited to, atmospheric observation, earth observation, space physics, and solar astronomy. Payload masses of up to 3700 kg with specialized equipment have been launched with balloons from prepared sites. These techniques include the use of large balloons, made, e.g., from 20 micron polyethylene film.

In a dynamic launch an entire balloon is laid on the ground and lifting gas is introduced into the top of the balloon. Since the lifting gas is at atmospheric pressure, the volume is small when compared to the manufactured volume of the balloon and a small bubble of gas is normally contained by a roller arm. At the time of launch, the roller is quickly removed and the small bubble of gas is permitted to rise, lifting the uninflated portion of the balloon and finally lifting the payload. This can be a very delicate maneuver requiring the payload to be mounted on a vehicle that can chase the balloon, moving in whatever direction the balloon may take as it is erecting itself. In light winds a crane may be used to suspend the payload prior to launch.

Present prior art methods are unable to lift rockets of sufficient size to place relatively large satellites in earth orbit. It is estimated that, in some cases, the mass of rocket motors necessary for such a launch is greater than 5000 kg. Existing balloon launch equipment is not rated for loads of this magnitude.

In certain prior art systems, balloons made of polyethylene film are destroyed by pulling on a button attached to the film. The film remains attached to the button and tears along a tape line.

There has long been a need for an effective and efficient system and method for launching a stratospheric balloon with a relatively heavy payload. There has long been a need for a balloon for use in such systems and methods. There has long been a need for such systems and methods for effectively raising a relatively heavy payload including a rocket and satellite to assist launch of the satellite. There has long been a need for an effective and efficient balloon assisted launch system and method for launching satellites into earth orbit, including a system with a rocket/satellite payload of about 5000 kg or more. There has long been a need for an effective and efficient system for selectively destroying a balloon.

SUMMARY OF THE PRESENT INVENTION

The present invention discloses, in certain embodiments a balloon initially contained in a shipping container. Only that portion of the balloon required to contain the total amount of lifting gas is unpacked from the balloon shipping container. In certain aspects this is less than ten percent of the balloon's total volume. This portion of the balloon is restrained, e.g. by webbing and/or tapes built into the balloon. The lifting gas, which is lighter than the surrounding atmosphere, is injected into the top of the balloon through one or more tubes built into the upper portion of the balloon. The webs or tapes are used for restraining lift and terminate at a release fitting which is attached between a cable or "main stay" and a plurality of main stay radials connected to the balloon. In certain aspects the main stay is controlled in length during the inflation and launch procedure. Lightweight stabilization lines may be used to prevent lateral balloon motion due to ambient wind conditions.

In certain embodiments about ninety percent of the balloon volume is initially uninflated and maintained within the shipping container. Sufficient gas is inserted into the balloon to create a buoyant force capable of lifting the entire balloon and the suspended payload. In one aspect, an additional amount of gas is injected, which creates an additional buoyant force referred to as "free lift". The length of the main stay is increased to erect the balloon directly over an anchor point in the absence of wind. At this point the entire buoyant force is balanced by the main stay and no forces are yet applied to the payload. The main stay is then lengthened gradually until a lifting force is applied to the payload through the balloon. The force in the main stay is reduced accordingly and the balloon repositions itself over the payload. As the payload is lifted from its resting position, the only force remaining in the main stay is the "free lift". The release fitting may be opened either mechanically (e.g. with a lanyard) or electrically (e.g. with an explosive bolt cutter such as a guillotine cutter driven by a spring and/or explosive gas) on command to disconnect the main stay and/or stabilization lines freeing the balloon.

In one aspect a release fitting according to the present invention releasably holds the main stay radials to the main stay.

A launch operation according to certain aspects of the present invention may be conveniently accomplished on the ground with appropriate anchors for both the stabilization lines and the main stay and any suitable mechanism or apparatus for controlling the length of the main stay (e.g., but not limited to a motorized winch; such a winch mounted on a truck or trailer; or a cable/pulley system on a truck or trailer). Such a launch may also be conducted on a boat, a platform, a powered semisubmersible platform or a barge, which may be towed downwind with a suitable tug or other type of work boat, to create a zero "relative wind" across the balloon during launch operations permitting better control by eliminating external aerodynamic forces. In addition, by launching on water, e.g. on a lake or at sea, instead of from established land-based launch facilities, range safety requirements may be considerably reduced and an operator may be much more flexible in choice of launch latitude and longitude, permitting greater freedom in the selection of orbit insertion parameters. Both expendable and reusable rocket motors may be recovered over water without regard to population density.

In one aspect, the material used for a balloon according to the present invention includes as one component any suitable light weight, woven fabric, including, but not limited to woven ripstop nylon material used in parachutes for years. It provides a load bearing component of a composite material according to the present invention which includes the fabric and a thin film. Any suitable thin film may be used, including, but not limited to polyester films, polyethylene films, mylar films, and nylon films. The thin film provides appropriate gas barrier properties and the resulting material has the required weight, gas barrier and load bearing properties. In one aspect the new composite material uses light weight parachute fabric built to military specification (i.e. MIL SPEC 7020). Under this specification, the fibers are treated to provide a suitable amount of protection from ultraviolet radiation. The film preferably has an appropriate gas barrier property and thermal compatibility with the fabric. In one aspect the material includes a light weight woven ripstop nylon fabric and thin plastic, e.g. Emblem or Capron nylon film, e.g. 48 gauge, available commercially. To laminate these materials together, an adhesive is used which retains the ability to bond the two materials at the extremely low temperatures encountered in flight through the stratosphere. Preferably, the weight of the adhesive is controlled to maintain a reasonable tear strength of the final material.

The balloon's design shape is, preferably, a "natural shape zero pressure" balloon. The attachments to this shape are, preferably, sewn into the balloon envelope to strengthen the joints. The balloon is made of a plurality of gores and the load bearing members are webs and/or tapes sewn into each gore seam and connected to both apex and base fittings using D-rings (e.g. as are commonly used in the parachute industry) to transfer loads from tapes to fittings. A second set of radial members are sewn into each gore seam and extended free of the envelope surface to the main stay release fitting. This permits the undeployed portion of the balloon envelope to be positioned outside the confluence point of these radials during the inflation and erection process.

Balloon systems described herein according to the present invention may be employed to lift payloads of any desired weight. In at least certain preferred embodiments the weight is at least 4,000 kg, 4,500 kg, 5,000 kg, 50,000 kg or more.

The majority of the energy required to place a unit of mass into orbit is normally used to overcome aerodynamic forces created as a system is accelerated from ground level through the atmosphere. The present invention reduces or eliminates the need for such a powerful first stage which is an expensive element in a ground launch. Instead, a balloon is used to lift a rocket motor system from the ground to an altitude where the density of the atmosphere is less than the sea level value, in certain aspects to an altitude with an atmospheric density less than ten percent of the sea level value, e.g. at altitudes above 18 kilometers at which global wind conditions are relatively benign. At this altitude, the system is released from the balloon and the motor is ignited. The system accelerates to a predetermined velocity where at "burn out" an interstage device separates from the motor, spins the remaining system to obtain stability and proper direction, and then ignites a final stage to achieve a desired orbit. Both motors and the interstage device fall to earth, but may be recovered if desired by either a parachute or other type of guided recovery system. A two-stage or a three stage configuration may be used, depending on the motor combination selected. Certain systems and methods according to this invention result in smaller motors, reduced environmental impact, reduced or eliminated range safety costs and permit wide flexibility in orbital location.

What follows are some of, but not all, the objects of this invention. In addition to the specific objects stated below for at least certain preferred embodiments of the invention, other objects and purposes will be readily apparent to one of skill in this art who has the benefit of this invention's teachings and disclosures. It is, therefore, an object of at least certain preferred embodiments of the present invention to provide:

New, useful, unique, efficient, nonobvious systems and methods that are relatively economical means of placing satellites into low earth orbit, in one aspect by using a balloon to lift payload, e.g. a suitable motor or set of motors and a satellite to a sufficiently high altitude where the aerodynamic forces occurring after ignition of the motors are small;

New, useful, unique, efficient, nonobvious balloons for such systems and methods;

New, useful, unique, efficient, nonobvious material for such balloons; and

New, useful, unique, efficient, nonobvious balloon launching systems and methods.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one skilled in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

FIG. 5 is a side view of a radial member used with a balloon according to the present invention.

FIG. 6A is a plan view of gore shapes used with a balloon according to the present invention. FIG. 6B is a cross-section view of the gores of FIG. 6A.

FIG. 7 is a top view of an apex assembly for a balloon according to the present invention.

FIG. 8 is a schematic side view of a balloon according to the present invention.

FIG. 10 is a schematic view of a balloon assisted launch system and method according to the present invention.

FIG. 11A is a front view of a release fitting according to the present invention. FIG. 11B is a side view of the fitting of FIG. 11A. FIG. 11C is an opened front view of the release fitting of FIG. 11A.

Figure 1:
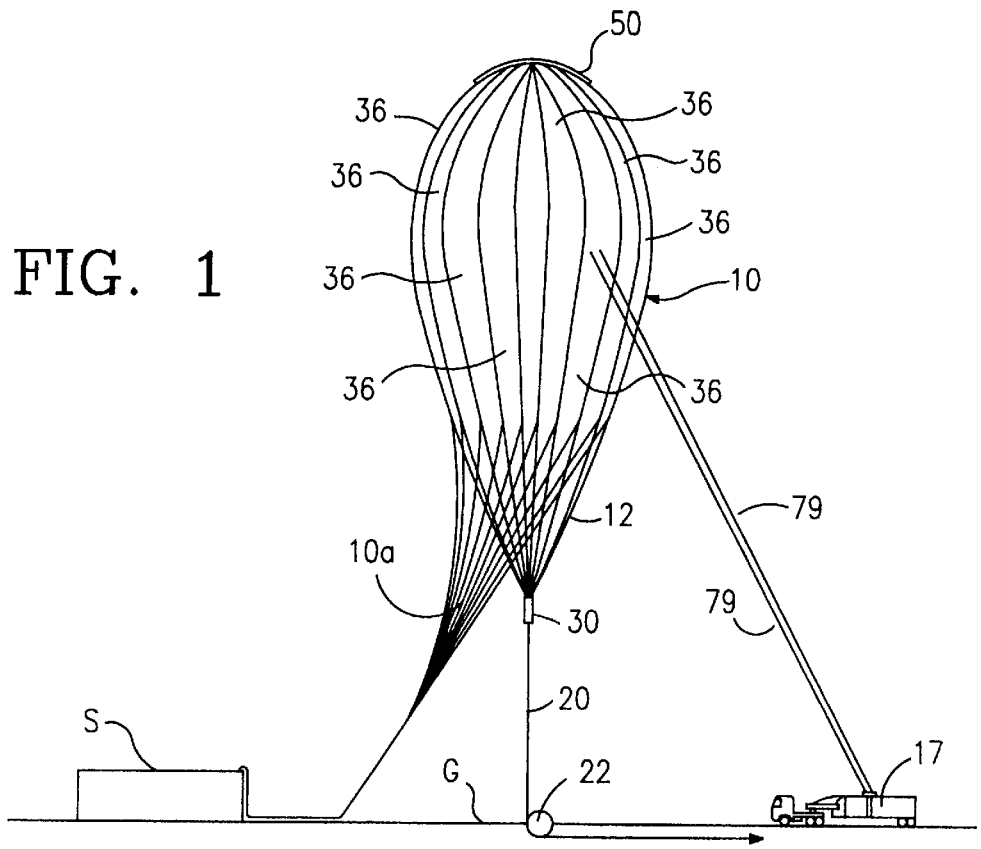
FIG. 1 is a schematic side view of a balloon assisted launch system according to the present invention.
Figure 2:
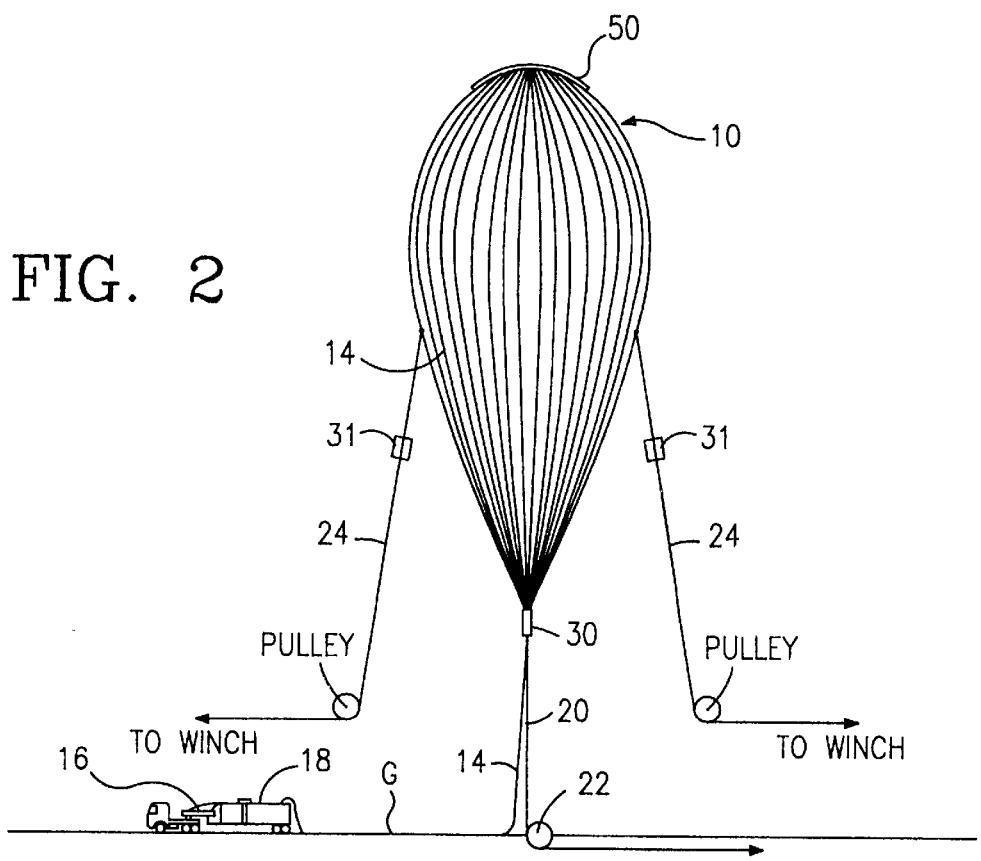
FIGS. 2–4 are schematic side views of steps in a launch method using the system of FIG. 1.

DETAILED DESCRIPTION OF EMBODIMENTS PREFERRED AT THE TIME OF FILING FOR THIS PATENT

In certain preferred embodiments, the balloon material according to the present invention that includes light weight woven ripstop nylon fabric laminated together with a thin nylon film.

In certain preferred embodiments, the material has the following properties:

| | | |
|---|---|---|
| Weight: | | Less than 60 grams per square meter (1.8 oz/yd$^2$) |
| Minimum Break Strength (ASTM D 5035) | Warp Direction | Greater than 7000 Newtons per meter (40 lbs/in) @ 23° C. |
| | Fill Direction | Greater than 7000 Newtons per meter (40 lbs/in) @ 23° C. |
| Minimum Break Strain: (ASTM D 5035) | Warp Direction | Greater than 15% @ 23° C. |
| | Fill Direction | Greater than 15% @ 23° C. |
| Grab Tensile Strength: (ASTM D 5034) (ASTM D 1683) | Dry Seam Efficiency | Ratio of Force Required to Fail a Dry French Fell Seam to Virgin Material Force using the specimen defined by the ASTM Grab Tensile Specification not less than 0.85. Seam stitched with 10 stitches per inch or more. |
| Tongue Tear Strength: (ASTM D 2261) | Warp Direction | Greater than 13 Newtons (3 lbs) @ 23° C. |
| | Fill Direction | Greater than 13 Newtons (3 lbs) @ 23° C. |
| Peel Strength: (ASTM D 5170) | Warp Direction | Less than 13 Newtons (3 lbs) @ 23° C. |
| | Fill Direction | Less than 13 Newtons (3 lbs) @ 23° C. |
| | Both Directions | Greater than zero @ −60° C. |
| Gas Transmission Rate (Through Material): (ASTM D 1434) | | Volummetric Loss of Helium Less than 3 × 10$^{-4}$ cc/sec @ 23° C. Volummetric Loss of Helium Less than 1 × 10$^{-4}$ cc/sec @ 0° C. Measured across a 9 cm diameter sample with a pressure differential of 300 inches of water. |
| Fabric Specification | | Performance equal or superior to MIL SPEC 7020 |
| Lamination | | Upon failure of sample, delamination will not propagate from break more than 2.5 cm at all temperatures from room to −60° C. |

Regarding the various properties listed above, "Fill Direction" is the cross direction of the loom that makes the fabric; "Warp Direction" is the continuous fiber direction of the loom; "Grab Tensile Strength" is the tensile strength of the fabric as measured by a tensile pull test of the center portion of a wide sample; "Tongue Tear Strength" is the tear strength of the fabric as measured by a tensile pull test of a slit sample with each side of the sample pulled in opposite directions; "Peel Strength" is the strength of the adhesive system as measured by a 180 degree pull of a film layer from the fabric layer.

In one particular lamination process, a solvent or a water-based adhesive is applied to a film. The thickness of the adhesive/film combination is controlled with a knife edge. The adhesive/film combination and fabric are fed together to nip rollers. Heating of the combination removes vapor. The material is then allowed to cure.

In certain preferred embodiments, the fabric fibers may be nylon, polyester, aramid, PBO [Poly(p-phenylene-2, 6-benzobisoxazola)] and polyethylene. In certain preferred embodiments the film may be nylon, polyester, polyimide, polyamide, and polyethylene.

A balloon according to certain preferred embodiments of the present invention is made of a plurality of side-by-side pieces or gores. The gore seams are joined using known techniques for joining the seams of fabric in parachutes. Each gore is, preferably, the combination of two half gores, although single full gores may be used. This use of half gores precut from a roll of material as shown in FIG. 6A reduces waste normally associated with the cutting of balloon gores. The half gores, as shown in FIGS. 6A and 6B, are precut and marked as to gore position prior to sewing. The gore seams are, preferably, known "French Fell" seams sewn with a double needle machine using nylon thread. The half gores are assembled and webbing or tape of sufficient length is sewn into place on the straight sides of the gores. Commercially available webbing and tapes are made from polyester, nylon, cotton; aramid, and other fibers. In one particular embodiment nylon webbing is used since it is thermally compatible with the fabric. The completed gores are identical in geometry and are sewn to each other with another French Fell seam without the use of webbing. Multiple gores, e.g. five or more are connected together and set aside for final assembly.

The end cap 52, located at the apex of the balloon is a circular piece of fabric that is also sewn into place at the ends of the gores. The webbing is free of the end cap and terminates in D-rings at an apex fitting, as shown in FIG. 7. This fitting accommodates the gores and a standard valve that controls exhausting of the lifting gas as a method of controlling pressure and altitude of the balloon.

An inflation tube 79 and vent ducts 76 are located as shown in FIG. 8, and are sewn into place at precut openings and are designed to provide no obstruction to the flow of gas. The multiple gore sections are then assembled into a completely closed envelope. Each line of needle holes is covered by a tape using an adhesive which retains strength at very low temperatures, e.g. commercially available adhesive ARCLAD 7876 of Adhesives Research Co.

The payload for the balloon system may be any desired payload to be lifted to a selected altitude, e.g., but not limited to, 5,000 kg, 10,000 kg, or more. In one aspect, the payload includes an appropriate motor or set of motors, a guidance and control system to position a satellite into orbit, and one or more satellites. In one aspect a system according to this invention is capable of placing a 100 kg to 200 kg payload into low earth orbit with existing solid rocket motors. Such motors are expendable launch vehicles. It is within the scope of this invention to use liquid fuel rockets or hybrid rockets (which use solid fuel and liquid oxidizer as propellant) which may be recovered, dramatically reducing the cost per launch.

FIGS. 1–4 show a balloon 10 according to the present invention and a balloon launch procedure. Initially a portion (not shown) of the balloon 10 is removed from the container S and an amount of gas is inserted into balloon 10 from a gas supply system 17 to provide sufficient buoyant force to lift the balloon 10 from the ground G. In one aspect, this amount of gas is also sufficient to provide buoyant force for lifting a payload and for additional "free lift". As shown in FIG. 1, a portion 10a of the balloon 10 (comprised of gores 36) is not yet fully deployed and inflated. The radials 12 identified in FIG. 1 have separated from the balloon and extend down to a release fitting 30. Webbing 11 is connected to a base fitting of the balloon which is connected to a payload 16 that initially rests on a truck 18. Gas may be supplied from the supply system 17, through a plurality of inflation tubes 79.

Figure 3:
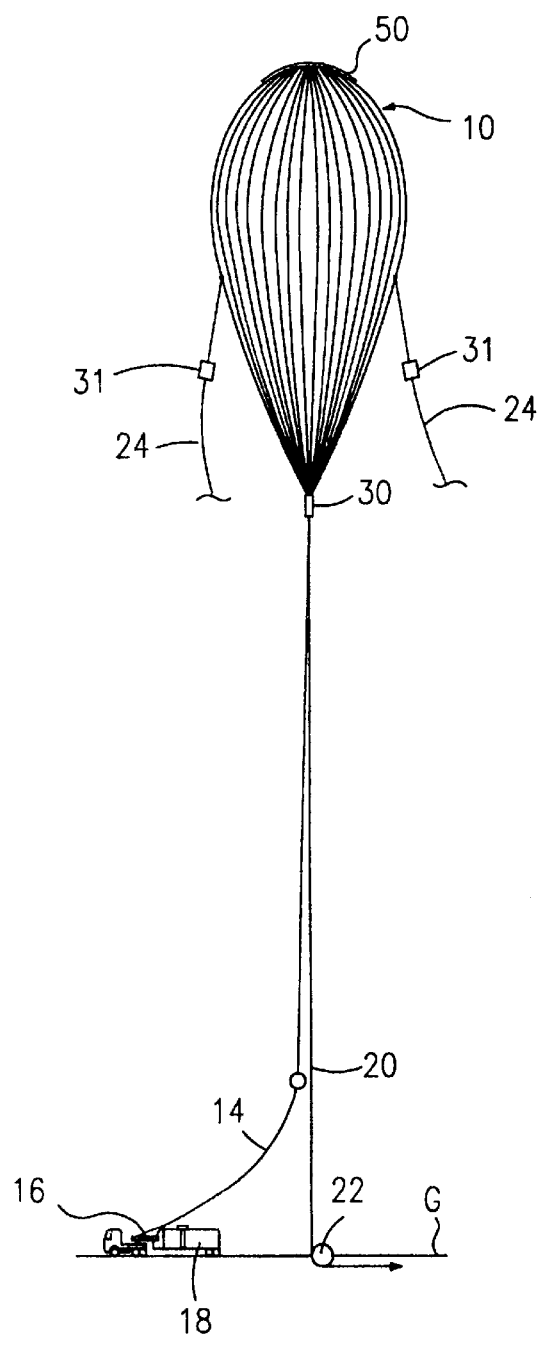

A line, cable or main stay 20 controlled e.g. via a pulley 22 and winch (not shown) holds the balloon 10 for selective release. As shown in FIG. 3, the tensile force of the main stay 20 and the buoyant force are balanced and the payload 16 has not been lifted from the truck 18. A plurality of main stay radial lines or "radials" 12 are interconnected between the main stay 20 and the balloon gore webbing 32.

Figure 4:
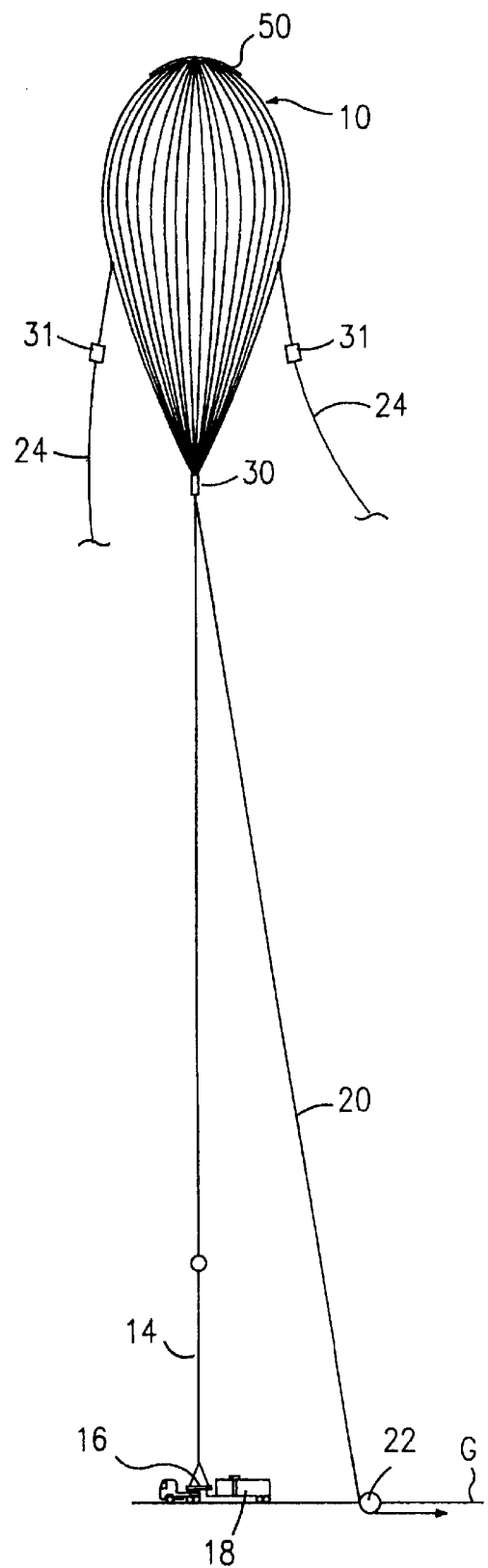

As shown in FIG. 4, the length of the main stay 20 has been increased and the balloon 10 has risen to a height at which buoyant force is applied to lift the payload 16 from the truck 18. The balloon 10 is positioned over the truck 18 by appropriate adjustment of the length of the main stay 20. An increase in length of the main stay reduces the force exerted by the main stay on the balloon 10 and the balloon moves to reposition itself over the payload 16. As the payload 16 is lifted from its rest position, the free lift is the only force acting on the main stay 20.

The main stay 20 and stabilization lines 24 are releasably held to the balloon 10 by a release fitting 30 and line cutters 31. When the balloon 10 reaches sufficient height and lifts the payload free from truck, the release fitting 30 is opened, either by pulling a lanyard or with an electrically powered control system which may include an RF receiver on the fittings. The stabilization lines 24 may be released either before or after the main stay.

FIG. 5 shows the detail of a seam radial tape or webbing member 32 used with the balloon 10 and connected to the main stay 20. Of five locations A, B, C, D, E on the member 32, the location A is the approximate point at which a termination D-ring 51 (see FIG. 7) is located. The D-rings transfer forces to the fittings. At location B, the member 32 is attached to a section or "gore" 36 of the balloon 10. At location C a main stay radial 12 is connected to a seam radial member 32 which is attached to a gore 36. At location D the seam radial member 32 is no longer sewn to the gore 36. Another D-ring is at location E. Box stitching may be used to attach parts to the gores. (In FIG. 5 top-to-bottom is right to left). The member 32 is made of, e.g. an appropriate webbing or tape.

FIGS. 6A and 6B show half gores 36a and 36b which are joined together with webbing of member 32 to form a gore 36. The balloon 10 is comprised of a plurality of gores 36 joined together. The gores are made, in one embodiment, of the material described herein according to the present invention. Alternatively, other suitable prior art material, although not preferred, is used. In one method, the gore material is cut with a laser or a knife blade. Tape 78 may be used over the stitching.

FIG. 7 shows an apex assembly 50 that is secured to the top of the balloon 10 by bolts which clamp an "O" ring to the film surface. A plurality of D-rings 51 (e.g. made of metal) are secured with bolts to a metal apex fitting 56. The balloon gores 36 are attached to the end cap 52 with stitching. The webbing 32 of gore seam 54 is secured to the gore at points 55 and then continue (unattached to the end cap 52) and are secured to the apex fitting 56 with D-rings 51. Preferably box stitching is used at the points 55 at which the radials separate from the gores and at the points 57 D-ring terminations.

As shown in FIG. 8, a balloon 10 has its apex assembly 50, a destruct assembly 70, a destruct line 72, an inflation tube 79 (one shown, one of a plurality, e.g. four such tubes); a valve cable assembly 74; main stay radials 12 (one shown of a plurality of e.g. seventeen); a vent duct 76; and a base fitting assembly 77.

The vent duct 76 maintains the lifting gas pressure near ambient. The base fitting assembly 77 transfers payload forces to the balloon radials.

Figure 9A:
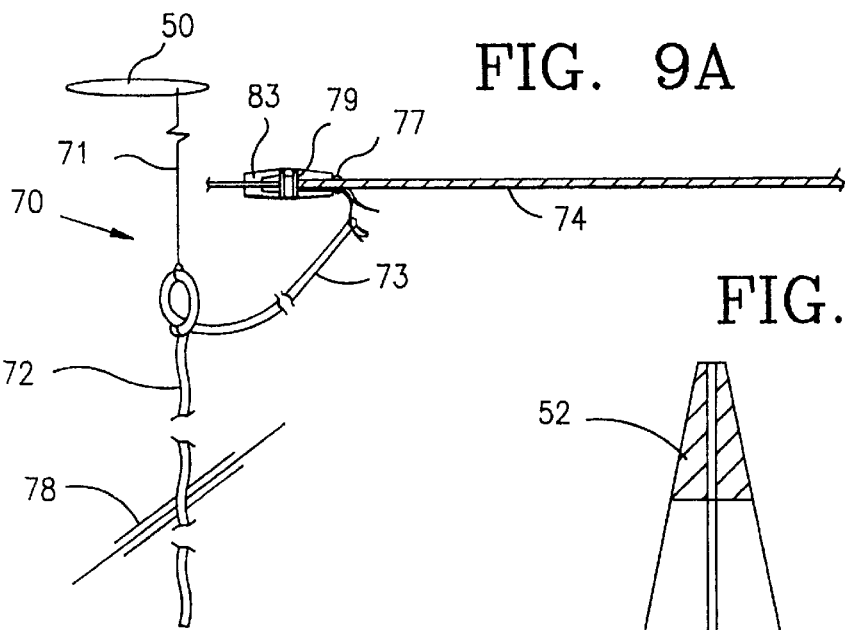
FIG. 9A is a schematic side view of a balloon destruct device according to the present invention.
Figure 9B:
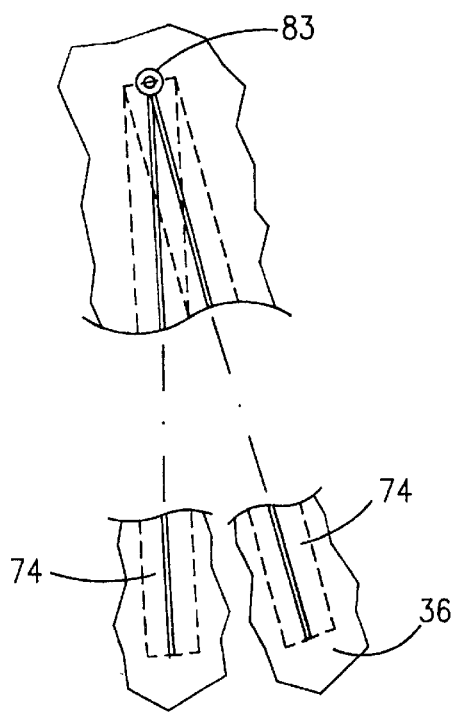
FIGS. 9B and 9C are plan views of the device of FIG. 9A.
Figure 9C:
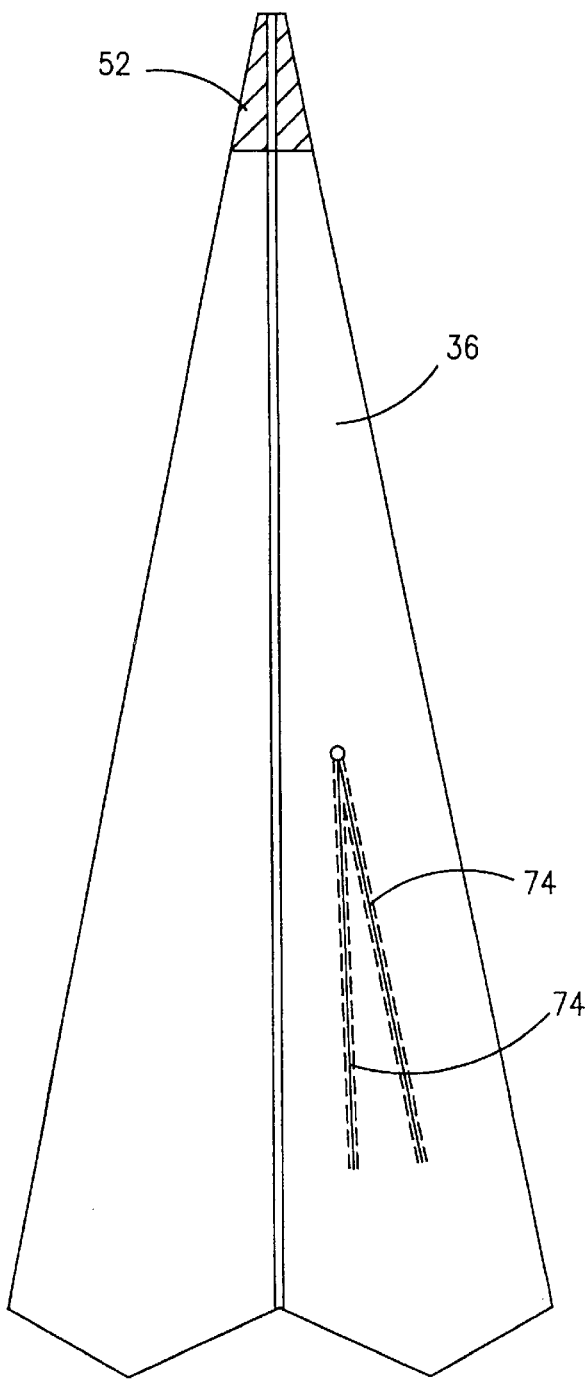

On one half gore, light weight webbing is sewn to the fabric in the shape of an inverted V near the apex of the balloon, as shown in FIGS. 9B and 9C. The vertex of this cable is passed through the wall of the balloon and sealed into place with an appropriate gasket material and sealing compound, e.g. RTV rubber. A loop on the inside of the balloon is connected to a line which extends to near the base of the balloon and is then connected to the payload. This device is used to destroy the balloon at the completion of the mission. FIGS. 9A–9C show various views of a destruct device 70 which is used to selectively destroy a balloon 10, e.g. once a payload has been released. The destruct device 70 is shown in FIG. 9A in its location relative to the apex assembly 50, e.g. about six to seven inches below the assembly 50. A break away line 71 is connected at its top end to the apex assembly 50 and at its bottom end to a loop in a destruct line 72 which extends down inside the balloon and is connected to the payload. A portion 73 of the destruct line 72 is connected to a loop of V web 74. The V web 74 is, preferably, made of nylon cord or webbing that passes through the balloon wall and extends down along one of the balloon gores 36. The destruct line 72 is, preferably, about twenty feet longer than the height of the balloon. Tape 78 may be used on the balloon to inhibit tearing of the film at that point. Stitching holding the V web 74 in place is, preferably, covered with two-inch wide nylon film attached with a pressure sensitive adhesive such as ARCLAD 7876 to prevent leakage of the lifting gas. A cork 79 cushions any stress concentrations caused by the button device 83. A seal 77 prevents the loss of lifting gas through this penetration in the balloon wall. Any low temperature sealant may be used which will bond to the film side of the laminate. In one aspect the destruct line 72 is 1000 pound test coreless nylon according to Military Specification MIL-C-7515 (USAF) and the breakaway line 71 is 25 pound test braided nylon line about twenty four inches long. In one aspect the V web 74 is about seven feet long and ends at equal distances from the gore seams. The button device 83 confines sealant used at this point of penetration to contain the lifting gas.

Following release of the payload from the balloon, or whenever balloon destruction is desired, pulling on the line 72 pulls the V web 74 apart from the balloon wall providing an opening for the escape of gas from within the balloon. Resulting tears at the bottom of the V web 74 may continue down to the base of the balloon.

FIG. 10 illustrates one payload launch procedure according to the present invention. A balloon 10 lifts a payload, steps A and B, including a rocket 80 with an attached satellite 82 to a desired altitude, sometimes called a "float" altitude at which the balloon will float with the payload. The rocket 80 is first released from the balloon and is then activated, step C, and a first rocket stage burnout and jettison occurs, step D, with a second rocket stage ignition. At step E, second rocket stage burnout occurs and a shroud is jettisoned, exposing a satellite. In step F a third rocket stage with the satellite attached ignites which reaches burnout in step G and orbital satellite operation in step H. In certain embodiments Step C occurs at an altitude of about 20 km; Step D at about 60 km; Steps G, H at about 360 km. In certain embodiments the rocket and payload are moving at about 14,000 ft/sec in Step D; at about 13,000 ft/sec in Step F; and at about 25,000 ft/sec in Step H.

FIGS. 11A–11C show one embodiment of a release fitting 30 according to the present invention that has a member 93 to which is secured an eye bolt 94 to which the main stay 20 is attached. The release fitting 30 reacts the forces in all the main stay radials 12 with a single force in the main stay 20. Each radial 12 is terminated with a loop which is held in place by a pin 116 which can rotate about an axle 108. The plurality and length of the pins are sufficient to hold all of the radials 12 which are positioned in order from the closing seam. The pins are releasably held in place by a notch 117 in the side 110. The sides 110 and 98, forming a restraint for the pin 116, functions like a pair of pliers whereby a bolt 96 is tightened to rotate the sides 110 and 98 about the axle 101. Alternately, a sufficiently strong cable could be used in place of the bolt 96. The entire mechanism is attached to the main stay 20 through an eyebolt 94. A hole 97 provides space for an explosive bolt cutter 99 which is powerful enough to sever the bolt on command. A bolt 101 holds together the sides 110 and 98 and the member 92. Bolts 91 secure a bar 93 to the members 92 and the eyebolt 94 is secured to the bar 93.

The present invention, therefore, in certain but not necessarily all embodiments, discloses a method for launching a satellite into earth orbit, the method including suspending a payload from a balloon, the payload including a launch rocket, the payload in certain aspects weighing at least about 4000 kg, 4500 kg, 5000 kg, 10000 kg, or more; and a satellite; raising the payload to a launch height with the balloon; releasing the payload from the balloon; igniting the launch rocket; and propelling the satellite to orbit (e.g. but not limited to earth orbit) with the launch rocket. Such a method may include one, some, or all of the following: wherein the balloon can raise the payload to any desired altitude, and, in one aspect to an altitude of at least 20 kilometers; wherein the satellite weighs at least 100 kg; wherein the launch rocket is powered by solid/liquid fuel; wherein the launch rocket includes a first rocket stage connected to a second rocket stage and the satellite is protected by a shroud, the method also including in the igniting step, first igniting the first rocket stage and then, following burnout of the first rocket stage and separation thereof from the second rocket stage, igniting the second rocket stage, and jettisoning the shroud from the satellite; and/or wherein the launch rocket includes a third rocket stage connected to the satellite and the method also including following jettisoning of the shroud, igniting the third rocket stage to move the satellite into earth orbit.

The present invention, therefore, in certain but not necessarily all embodiments, discloses a method for launching a satellite into orbit, the method including suspending a payload from a balloon, the payload including a launch rocket weighing at least 5000 kg and a satellite weighing at least 100 kg, raising the payload to a launch height with the balloon, releasing the payload from the balloon, igniting the launch rocket, and propelling the satellite to orbit with the launch rocket, wherein the launch rocket includes a first rocket stage connected to a second rocket stage and a third rocket stage connected to the second rocket stage and the satellite is protected by a shroud, the method further including in the igniting step, first igniting the first rocket stage and then, following burnout of the first rocket stage and separation thereof from the second rocket stage, igniting the second rocket stage, and jettisoning the shroud from the satellite, and igniting the third rocket stage to move the satellite into earth orbit.

The present invention, therefore, in certain but not necessarily all embodiments, discloses a release fitting for releasably holding at least one line to at least one item, the release fitting including a first body part, a second body part, and a third body part, the first and second body parts pivotably secured to the third body part, a bolt with a first bolt portion connected to a first portion of the first body part and a second bolt portion connected to a first portion of the second body part, the first portion of the first body part spaced apart from the first portion of the second body part, at least one pin with a first pin end movably connected to a second portion of the second body part, the pin suitable for attaching thereto the at least one line, the first body part having a recess for releasably receiving a second pin end of the pin, the bolt initially holding apart the first portion of the first body part and the first portion of the second body part to thereby maintain the second pin end in the recess, the third body part connected to the at least one item, bolt cutter apparatus for selectively cutting the bolt to permit the first portion of the first body part to move toward the first portion of the second body part, thereby freeing the second pin end from the recess and releasing the at least one line from the pin. In such a fitting the at least one line may be a plurality of balloon radials and the at least one line may be a balloon main stay. Also the bolt cutter apparatus may be an explosive apparatus for cutting the bolt.

The present invention, therefore, in certain but not necessarily all embodiments, discloses a deployment method for deploying a balloon, the method including removing a portion of a balloon to be inflated from a container initially containing the entire balloon, the balloon comprising a balloon envelope with a plurality of spaced-apart radial lines connected to the balloon envelope around a circumference thereof, said plurality of spaced-apart radial lines extending downwardly from the balloon to a confluence point at a main stay release fitting, positioning an undeployed portion of the balloon envelope away from the confluence point, then inflating the deployed portion so that the deployed portion is positioned above the confluence point. Such a method may include one, some or all of the following: wherein the balloon has a fully deployed volume and the undeployed portion of the balloon is about ninety percent of the fully deployed balloon volume; wherein a main stay is connected to and beneath the release fitting and exerts a force thereon and the method also including inflating the balloon envelope so that a buoyant force of the balloon is balanced by the force of the main stay; wherein a payload is connected to the main stay and the method also including lengthening the main stay gradually, and applying a lifting force to the payload; activating the release fitting to free the balloon from the main stay; and/or wherein the release fitting comprises a first body part, a second body part, and a third body part, the first and second body parts pivotably secured to the third body part, a bolt with a first bolt portion connected to a first portion of the first body part and a second bolt portion connected to a first portion of the second body part, the first portion of the first body part spaced apart from the first portion of the second body part, at least one pin with a first pin end movably connected to a second portion of the second body part, the pin suitable for attaching thereto the at least one line, the first body part having a recess for releasably receiving a second pin end of the pin, the bolt initially holding apart the first portion of the first body part and the first portion of the second body part to thereby maintain the second pin end in the recess, the third body part connected to the at least one item, bolt cutter apparatus for selectively cutting the bolt to permit the first portion of the first body part to move toward the first portion of the second body part, thereby freeing the second pin end from the recess and releasing the at least one line from the pin, and the method including activating the release fitting to free the balloon from the main stay.

The present invention, therefore, in certain but not necessarily all embodiments, discloses balloon material including woven fabric with a weight less than 60 grams per square meter, synthetic film laminated to the woven fabric producing laminated fabric, the film bonded to the fabric with an adhesive, the film remaining bonded to the woven fabric at a temperature of −60 degrees C. Such balloon material of in one aspect has the following characteristics: weight less than 60 grams per square meter, gas transmission rate of a volummetric loss of helium less than $3 \times 10^{-4}$ cc/sec@23° C., peel strength of less than 13 Newtons at 23° C. in warp direction and in fill direction, and minimum break strength greater than 7000 Newtons per meter.

The present invention, therefore, in certain but not necessarily all embodiments, discloses a balloon with a balloon envelope made of balloon material; the balloon material including woven fabric with a weight less than 60 grams per square meter, synthetic film laminated to the woven fabric producing laminated fabric, the film bonded to the fabric with an adhesive, the film remaining bonded to the woven fabric at a temperature of −60 degrees C.

The present invention, therefore, in certain but not necessarily all embodiments, discloses a balloon with a balloon envelope made of a plurality of interconnected gores, each pair of adjacent gores connected along a gore seam, a plurality of spaced-apart main stay radial lines around a circumference of the balloon envelope, each of the plurality of main stay radial lines connected to a gore seam, said plurality of main stay radial lines extending down to a release fitting, and a main stay connected to and beneath the release fitting. Such a balloon may have all, some or all of the following: wherein the release fitting has a first body part, a second body part, and a third body part, the first and second body parts pivotably secured to the third body part, a bolt with a first bolt portion connected to a first portion of the first body part and a second bolt portion connected to a first portion of the second body part, the first portion of the first body part spaced apart from the first portion of the second body part, at least one pin with a first pin end movably connected to a second portion of the second body part, the pin suitable for attaching thereto the at least one line, the first body part having a recess for releasably receiving a second pin end of the pin, the bolt initially holding apart the first portion of the first body part and the first portion of the second body part to thereby maintain the second pin end in the recess, the third body part connected to the at least one item, bolt cutter apparatus for selectively cutting the bolt to permit the first portion of the first body part to move toward the first portion of the second body part, thereby freeing the second pin end from the recess and releasing the at least one line from the pin; wherein the gores are made of balloon material with woven fabric with a weight less than 60 grams per square meter, synthetic film laminated to the woven fabric producing laminated fabric, the film bonded to the fabric with an adhesive, the film remaining bonded to the woven fabric at a temperature of −60 degrees C; wherein each gore of the plurality of gores is made of two half gores sewn together at a seam, the seam overlaid with webbing material sewn thereover; a self destruct apparatus; wherein the self-destruct apparatus has at least one cord on a wall of the balloon, a pull line connected to the at least one cord for pulling the at least one cord to tear the balloon wall so gas therein may escape; and/or wherein the at least one cord is two cords positioned in an inverted V shape on the balloon wall.

The present invention, therefore, in certain but not necessarily all embodiments, discloses a self-destruct apparatus for selectively tearing a wall of a balloon to permit gas therein to escape, the self-destruct apparatus having at least one cord on a wall of the balloon, a pull line connected to the at least one cord for pulling the at least one cord to tear the balloon wall so gas therein may escape. Such a self-destruct apparatus may have the at least one cord comprising two cords positioned in an inverted V shape on the balloon wall.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. § 102 and satisfies the conditions for patentability in § 102. The invention claimed herein is not obvious in accordance with 35 U.S.C. § 103 and satisfies the conditions for patentability in § 103. This specification and the claims that follow are in accordance with all of the requirements of 35 U.S.C. § 112. The inventors may rely on the Doctrine of Equivalents to determine and assess the scope of their invention and of the claims that follow as they may pertain to apparatus not materially departing from, but outside of, the literal scope of the invention as set forth in the following claims.

What is claimed is:

1. A release fitting for releasably holding at least one line to at least one item, the release fitting comprising a first body part, a second body part, and a third body part, the first and second body parts pivotably secured to the third body part, a bolt with a first bolt portion connected to a first portion of the first body part and a second bolt portion connected to a first portion of the second body part, the first portion of the first body part spaced apart from the first portion of the second body part, at least one pin with a first pin end movably connected to a second portion of the second body part, the pin suitable for attaching thereto the at least one line, the first body part having a recess for releasably receiving a second pin end of the pin, the bolt initially holding apart the first portion of the first body part and the first portion of the second body part to thereby maintain the second pin end in the recess, the third body part connected to the at least one item, bolt cutter apparatus for selectively cutting the bolt to permit the first portion of the first body part to move toward the first portion of the second body part, thereby freeing the second pin end from the recess and releasing the at least one line from the pin.

2. The release fitting of claim 1 wherein the at least one line is a plurality of balloon radials and the at least one item is a balloon main stay.

3. The release fitting of claim 1 wherein the bolt cutter apparatus is explosive apparatus for cutting the bolt.

* * * * *